(12) United States Patent
Dietrich

(10) Patent No.: US 6,364,359 B1
(45) Date of Patent: Apr. 2, 2002

(54) ARRANGEMENT FOR A BELT LEVEL ADJUSTER OF A SAFETY BELT SYSTEM

(75) Inventor: Guenter Dietrich, Freiberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/802,990

(22) Filed: Mar. 12, 2001

(30) Foreign Application Priority Data

Mar. 11, 2000 (DE) .......................................... 100 11 906

(51) Int. Cl.⁷ .......................... B60R 22/20; B60R 22/28
(52) U.S. Cl. ..................... 280/801.2; 280/805; 297/472
(58) Field of Search .............................. 280/801.2, 805, 280/808, 748, 751; 297/470, 471, 472; 296/189

(56) References Cited

U.S. PATENT DOCUMENTS

| | | | | |
|---|---|---|---|---|
| 4,469,352 A | * | 9/1984 | Korner et al. | |
| 4,702,493 A | * | 10/1987 | Escaravage | |
| 5,573,272 A | * | 11/1996 | Teshima | |
| 5,692,780 A | * | 12/1997 | Yasui | |
| 5,769,456 A | | 6/1998 | Juchem et al. | |
| 5,782,491 A | * | 7/1998 | Patel | |
| 5,791,687 A | | 8/1998 | Gotou | |
| 6,032,982 A | * | 3/2000 | Pakulsky et al. | |
| 6,106,012 A | * | 8/2000 | Boegge et al. | |
| 6,244,626 B1 | * | 6/2001 | Monaghan et al. | |
| 6,254,133 B1 | * | 7/2001 | Schmid | |

FOREIGN PATENT DOCUMENTS

| | | |
|---|---|---|
| DE | 43 41 119 A1 | 6/1995 |
| DE | 295 19 483 U1 | 5/1996 |
| DE | 196 51 092 A1 | 7/1997 |
| DE | 299 12 874 U1 | 1/2000 |

* cited by examiner

*Primary Examiner*—Paul N. Dickson
(74) *Attorney, Agent, or Firm*—Crowell & Moring LLP

(57) ABSTRACT

An arrangement for a passenger vehicle safety belt level adjuster includes a receptacle with a deformation element, and a carrier plate for a detent rail of a belt level adjuster. The receptacle is configured to be mounted as a constructional unit into a vehicle column together with the deformation element and carrier plate.

17 Claims, 5 Drawing Sheets

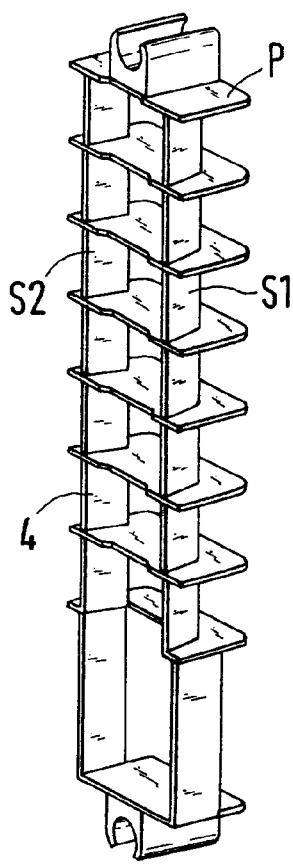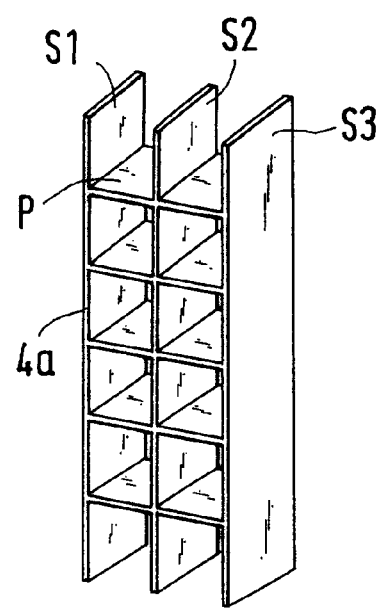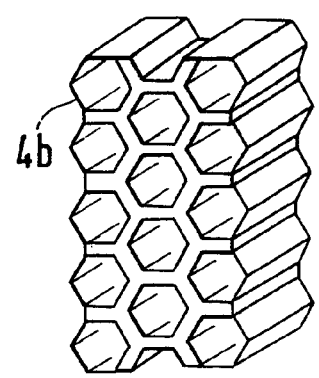
Fig.6
Fig.7
Fig.8

US 6,364,359 B1

ARRANGEMENT FOR A BELT LEVEL ADJUSTER OF A SAFETY BELT SYSTEM

BACKGROUND AND SUMMARY OF THE INVENTION

This application claims the priority of German Patent Document 100 11 906.9, filed in Germany, Mar. 11, 2000, the disclosure of which is expressly incorporated by reference herein.

The invention relates to an arrangement for a belt level adjuster of a safety belt system which is arranged in a column or pillar of a vehicle, and a deformation element is arranged between a detent rail of the belt system and the column.

From German Patent Document 295 19 483 U1, an arrangement is known for a belt level adjuster of a safety belt system in a motor vehicle which is fastened by means of a detent rail by means of a deformation element on a column of a vehicle body. Furthermore, from German Patent Document DE 43 41 119 A1 (corresponding U.S. Pat. No. 5,769,456), a preassembled carrier unit for operating parts of a safety belt system is known, which receives the operating parts of the belt system and, on the whole, can be fastened on a column of the vehicle body. In addition, from German Patent Document DE 196 51 092 A1 (corresponding U.S. Pat. No. 5,791,687), a safety belt system for a vehicle is known which forms an anchoring rail for the belt arrangement which, by way of screws, is connected with a column wall of the vehicle body and bases the screws in an impact absorption element. In an impact situation, this element will deform and plastically absorb impact energy.

It is an object of the invention to provide an arrangement for a belt level adjuster of a safety belt system which can be connected with a vehicle column and can be exchanged by a simple mounting and demounting method. Furthermore, an optimal energy absorption is to be ensured in the event of a head impact and damage to the column and of the carrier parts of the belt system are to be avoided.

According to the invention, this object is achieved by providing an arrangement for a belt level adjuster of a safety belt system which is arranged in a column of a vehicle, and a deformation element is arranged between a detent rail of the belt system and the column, wherein the deformation element is arranged in a receptacle and the receptacle can be fastened in a cutout or an indentation of a column wall of a vehicle body column by way of screwing devices, and wherein a carrier plate is arranged on a frontal side of the deformation element, which has a connected belt system detent rail which is held in the receptacle.

Principal advantages achieved by means of the invention are that, as a result of the arrangement of the deformation element in a receptacle, the entire constructional unit, essentially consisting of the deformation element of the carrier plate with the detent rail and the belt level adjuster, can be inserted as a complete constructional unit in a cutout of a column of the vehicle body. This also permits a rapid mounting and demounting in a simple manner. The receptacle can be arranged in the B-column and/or the C-column.

So that a fastening of the detent rail on a vehicle body column can be achieved in a simple manner, it is connected by at least one screw with the carrier plate which, in turn, is supported in the receptacle on bent-away legs or similar bent-away parts. The receptacle is connected by screws with a side wall, either in the A-column or B-column or with both columns of the vehicle body structure. As a result, an exchange of the entire unit by being unscrewed from the vehicle column is permitted after a head impact and a deformed deformation element.

The detent rail is fastened on the carrier plate by at least one screwed connection and one hook-in connection, so that only the receptacle with the deformation element and the carrier plate need be exchanged.

The carrier plate according to certain preferred embodiments of the invention has a hook-in connection at the lower end which consists of a longitudinal slot or of two longitudinal slots which can be caused to engage with at least one protruding hook or two hooks on a web of the detent rail. A carrier plate according to certain preferred embodiments of the invention has at least one keyhole-shaped opening as a hook-in connection at the lower end, in which opening at least one pin of the detent rail can be engaged. These different carrier plates, also called adapter plates, are applied for using either a mechanical belt level adjuster or an electric belt level adjuster.

The deformation element may have different constructions and consists, for example, in certain preferred embodiments, of a deformable rib body, whose legs extend approximately at a right angle to the carrier plate and are spaced with respect to one another and horizontal plates are arranged between the legs and form hollow spaces with the legs. However, other types of deformation elements can also be used, such as honeycomb bodies or similar deformation bodies. What is important is only that the energy generated during the head impact can be plastically absorbed.

The receptacle is connected by way of screws with the body wall of the column. Furthermore, a welded solution is also contemplated. In this case, fastening angles are provided laterally of the receptacle which are connected with the vehicle body or with a column wall of the vehicle body by welding.

The advantage of the system is also that tensile forces as well as pressure forces are absorbed.

Other objects, advantages and novel features of the present invention will become apparent from the following detailed description of the invention when considered in conjunction with the accompanying drawings.

BRIEF DESCRIPTION OF THE DRAWINGS

FIGS. 6 to 8 are views of various embodiments of deformation elements for use with preferred embodiments of the invention;

DETAILED DESCRIPTION OF THE DRAWINGS

Figure 1:
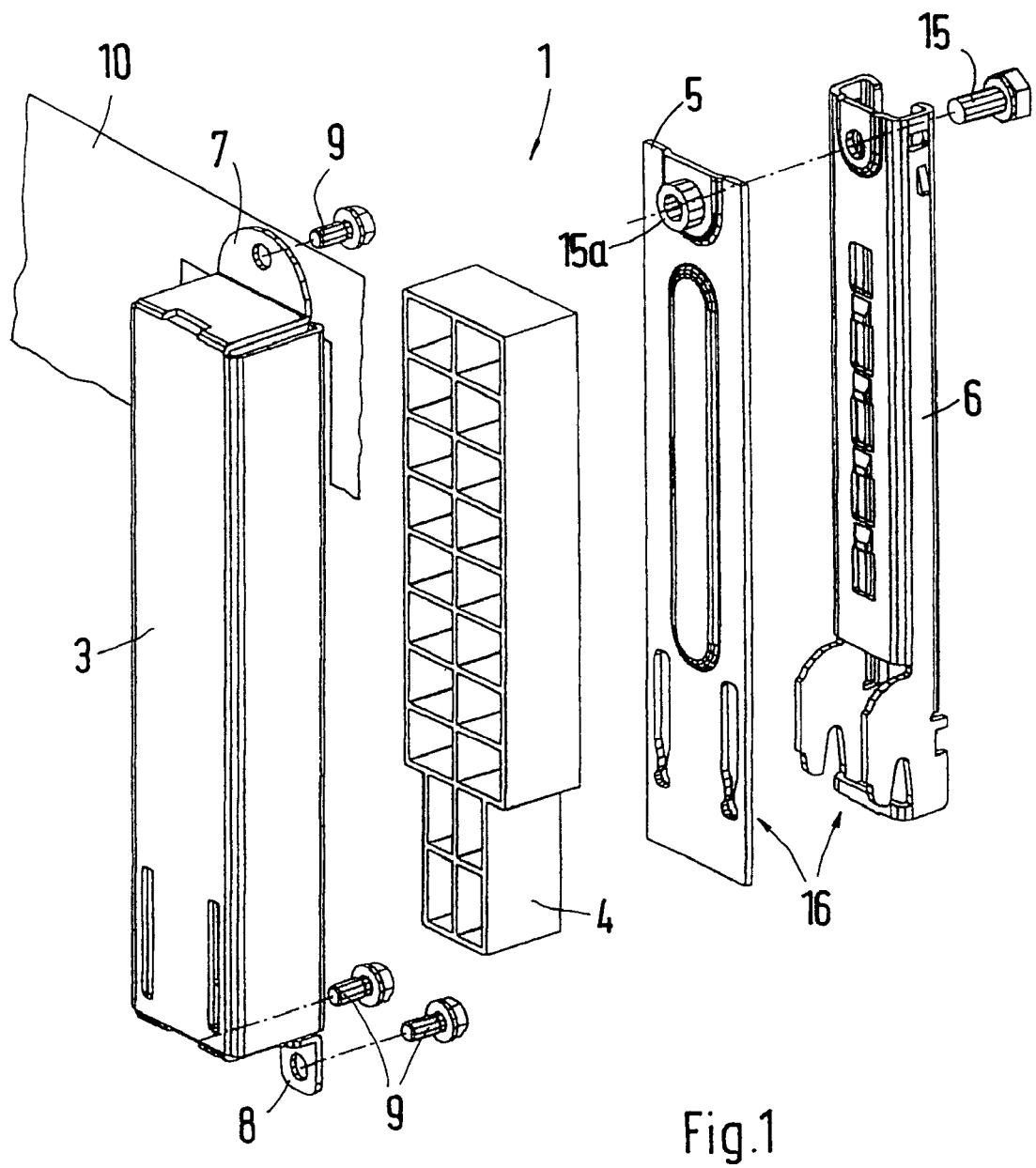
FIG. 1 is a diagrammatic perspective representation of individual components of an arrangement for a belt level adjuster constructed according to a preferred embodiment of the invention.
Figure 2:
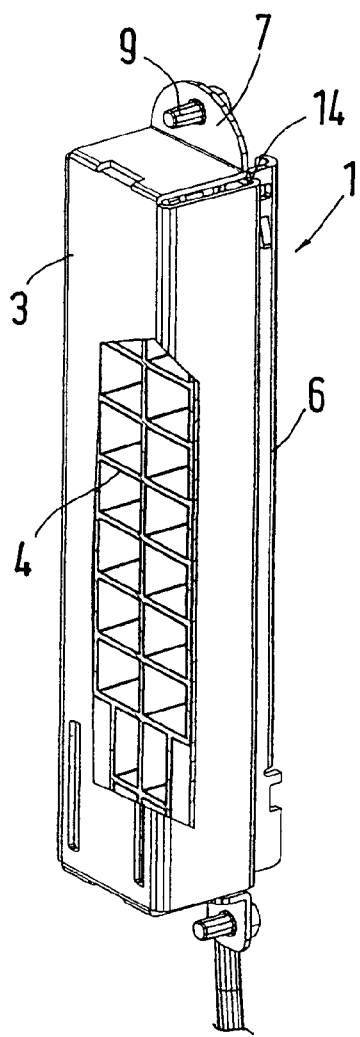
FIG. 2 is a partly cut away perspective view of a receptacle for receiving the deformation element with the carrier plate and the detent rail in accordance with the embodiment of FIG. 1.
Figure 3:
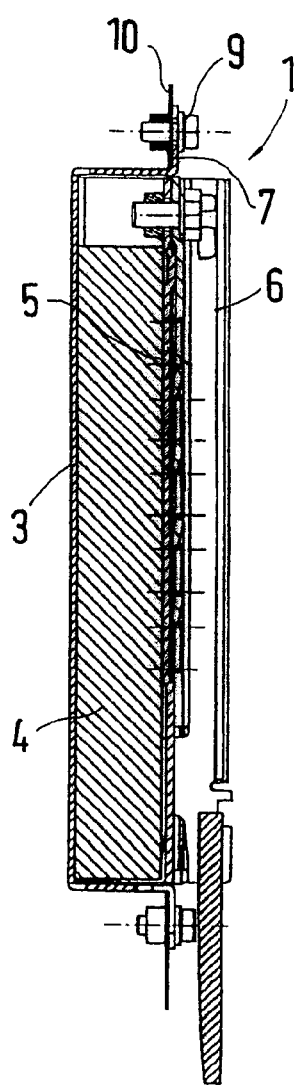
FIG. 3 is a vertical sectional view of the receptacle with the deformation element, the carrier plate and the detent rail in accordance with the embodiment of FIG. 1.

The arrangement 1 for a belt level adjuster of a safety belt system comprises a receptacle 3 which can be inserted in a vehicle body column 2 and in which a deformation element 4; 4a; 4b and a carrier plate 5; 5a are arranged. A detent rail 6 for a belt level adjuster, which is not shown in detail, is connected with the carrier plate.

Figure 5:
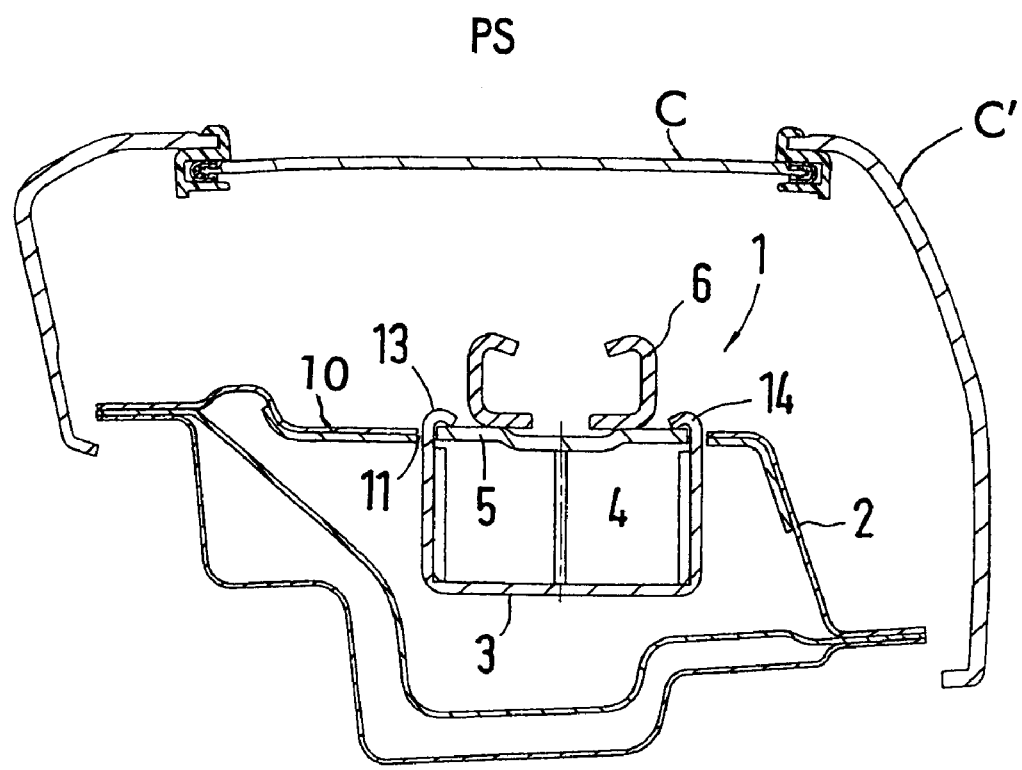
FIG. 5 is a horizontal sectional view of a vehicle body column, showing an assembly according to a preferred embodiment of the invention.

The receptacle 3 has a trough-shaped construction and is fastened by way of frontal bent-away parts 7, 8 by means of screws 9 to a column wall 10. The column wall 10 has a recess 11 into which the receptacle 3 is inserted as shown in FIG. 5. Also shown schematically in FIG. 5 are upholstery type covering parts C and C' which are disposed at the passenger space side PS of the body column 2.

As illustrated in detail in FIGS. 1 to 4, the deformation element 4 is supported at the bottom 12 of the receptacle 3 and is held in the receptacle 3 by way of the carrier plate 5. For this purpose, this carrier plate 5 is disposed in the receptacle 3 by way of lateral bends 13, 14.

A locking of the detent rail 6 on the carrier plate 5; 5a takes place by way of at least one screw 15 and one hook-in connection 16; 16a. The screw 15 is connected by way of a weld nut 15a with the carrier plate 5. Several connection screws 15, specifically one at the top end and another at the bottom end of the detent rail 6, may be provided, either with or without a hook-in connection 16; 16a.

The carrier plate 5; 5a and the detent rail 6 have a width and length which corresponds to the opening of the receptacle 3, so that a dipping into the receptacle 3 can take place in the event of a head impact. As a result of this arrangement and connection of the detent rail 6 with the carrier plate 5; 5a, in the event of a head impact, the carrier plate 5; 5a, together with the detent rail 6, while deforming the deformation element 4, will move into the receptacle 3 while absorbing impact energy. It is to be achieved in this case that only the deformation element 4 will be damaged and must be exchanged.

Figure 4:
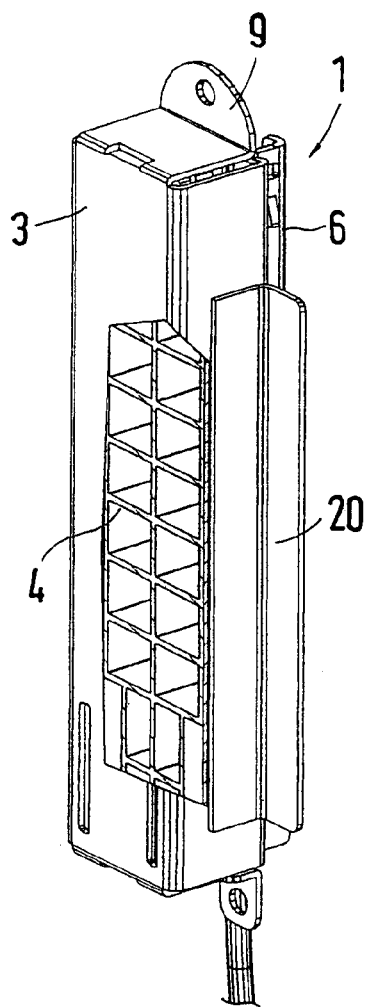
FIG. 4 is a view of the receptacle, as in FIG. 2, but with a welded connection with the column.

The receptacle 3 can be connected by way of screws 9 and also by means of a welding with the vehicle body column 2. For this purpose, bends 20 as shown in FIG. 4 are provided on the receptacle 3 and are fastened to the column wall 10.

FIGS. 6 to 8 are schematic views of deformation elements 4; 4a; 4b. The deformation element 4 consists of a grid structure with laterally continuous vertical legs S1 and S2, between which horizontally constructed plates P are arranged.

The deformation element 4a has a grid structure with more than two legs S1, S2 and S3, and horizontal plates P extending between these legs S1, S2 and S3. The deformation element in FIG. 8 has a honeycomb structure.

Figure 9:
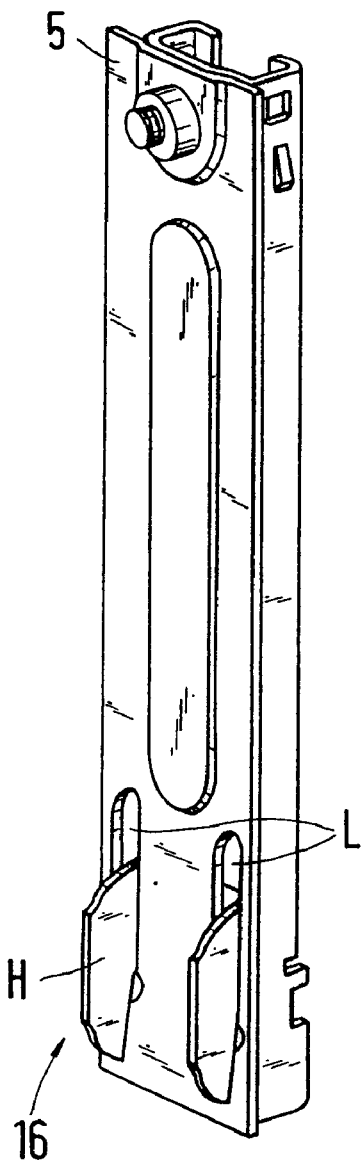
FIG. 9 is a view of a carrier plate having a hook-in connection for the detent rail, which hook-in connection consists of longitudinal slots, in accordance with a preferred embodiment of the invention.
Figure 10:
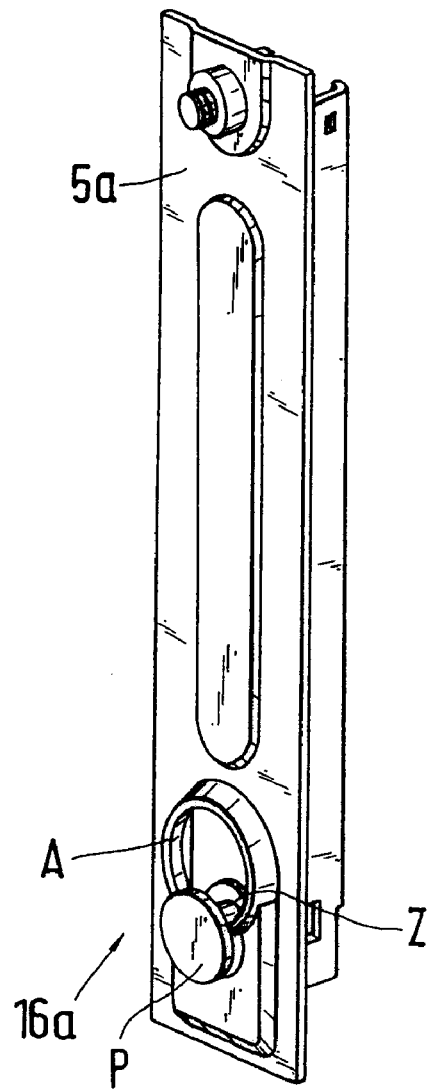
FIG. 10 is a view of a carrier plate with a key-shaped hook-in connection for the detent rail, in accordance with other preferred embodiments of the invention.

FIGS. 9 and 10 show the carrier plates 5 and 5a which can be used in the case of the arrangement 1. They have hook-in connections 16 and 16a with longitudinal slots L and a key-shaped receiving device A. The hook 4 and the pin Z are correspondingly constructed on the detent rail 5; 5a.

The hooks H engage in the slots L and hook into these. The hook Z consists of a basic pin which is closed off on the end side by a circular plate P which has a larger diameter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for a belt level adjuster of a safety belt system which is arranged in a vehicle body column of a vehicle, a deformation element being arranged between a detent rail of the belt system and the vehicle body column,
   wherein the deformation element is arranged in a receptacle and the receptacle can be fastened in a cutout or an indentation of a column wall of the vehicle body column by way of screwing devices and, a carrier plate is arranged on a frontal side of the deformation element, which has a connected belt system detent rail and is held in the receptacle.

2. Arrangement according to claim 1,
   wherein the carrier plate is held in the receptacle in a manner supported by way of inward-projecting bent-away sections of the receptacle and the detent rail is fixed on the carrier plate in at least one weld nut by way of at least one fastening screw, and
   wherein the carrier plate is arranged in a mounted operating position resting against the bent-away sections of the receptacle and, in a head impact position, is arranged detached from these bent-away sections of the receptacle.

3. Arrangement according to claim 1,
   wherein the deformation element consists of a plastically deformable rib body with legs extending approximately at a right angle with respect to the carrier plate and spaced with respect to one another, and with plates extending between these legs, which plates form hollow spaces with the legs.

4. Arrangement according to claim 2,
   wherein the deformation element consists of a plastically deformable rib body with legs extending approximately at a right angle with respect to the carrier plate and spaced with respect to one another, and with plates extending between these legs, which plates form hollow spaces with the legs.

5. Arrangement according to claim 1,
   wherein the carrier plate has at its lower end at least one longitudinal slot as a hook-in connection, which longitudinal slot can be caused to engage with at least one protruding hook on a web of the detent rail.

6. Arrangement according to claim 2,
   wherein the carrier plate has at its lower end at least one longitudinal slot as a hook-in connection, which longitudinal slot can be caused to engage with at least one protruding hook on a web of the detent rail.

7. Arrangement according to claim 1,
   wherein the carrier plate, has at least one key-shaped opening as a hook-in connection at its bottom end which at least one key-shaped opening can be caused to engage with at least one pin on a web of the detent rail, and the pin has an end-side detent plate.

8. Arrangement according to claim 2,
   wherein the carrier plate, has at least one key-shaped opening as a hook-in connection at its bottom end which at least one key-shaped opening can be caused to engage with at least one pin on a web of the detent rail, and the pin has an end-side detent plate.

9. Arrangement according to claim 1,
   wherein the receptacle has fastening angles on lateral legs, which fastening angles rest in use against a column wall of the vehicle body column in the installed condition, and can be connected with these by means of a weld.

10. Arrangement according to claim 1,
wherein a constructional unit consisting of the receptacle, the deformation element, the carrier plate with the detent rail and the belt lever adjuster, can be mounted as a complete constructional unit into the vehicle body column.

11. A vehicle safety belt adjuster assembly for a vehicle having a vehicle column with a hollow space therein, comprising:
a receptacle which in use is connected to the vehicle column and protrudes into a hollow space of the column, a belt system detent rail, and
a deformation element disposed in the receptacle and facing the detent rail, said deformation element being operable in use to absorb passenger collision forces against the detent rail by plastic deformation of the deformation element,
wherein said deformation element is detachably held in the receptacle so as to accommodate replacement of the deformation element after it is deformed in a collision without requiring replacement of other parts of the vehicle column and detent rail.

12. A vehicle safety belt adjuster assembly according to claim 11,
comprising a carrier plate for the detent rail which is interposed between the detent rail and deformation element.

13. A vehicle safety belt adjuster assembly according to claim 12,
wherein the carrier plate is held in the receptacle by projecting bent sections of the receptacle, said carrier plate being moved away from the projecting bent section by collision forces against the detent rail causing deformation of the deformation element.

14. Arrangement according to claim 13,
wherein the carrier plate has at its lower end at least one longitudinal slot as a hook-in connection, which longitudinal slot can be caused to engage with at least one protruding hook on a web of the detent rail.

15. Arrangement according to claim 13,
wherein the carrier plate, has at least one key-shaped opening as a hook-in connection at its bottom end, which at least one key-shaped opening can be caused to engage with at least one pin on a web of the detent rail, and the pin has an end-side detent plate.

16. Arrangement according to claim 13,
wherein the receptacle has fastening angles on its lateral legs, which fastening angles rest in use against a column wall of the vehicle body in the installed condition, and can be connected with these by means of a weld.

17. Arrangement according to claim 13,
wherein a constructional unit consisting of the receptacle, the deformation element, the carrier plate with the detent rail and a belt lever adjuster, can be mounted as a complete constructional unit into the vehicle column.

* * * * *